United States Patent
Tardivon et al.

(10) Patent No.: US 9,906,970 B2
(45) Date of Patent: Feb. 27, 2018

(54) METHOD FOR MONITORING COMMUNICATION BETWEEN A TRANSMITTER AND A RECEIVER

(71) Applicant: Schneider Electric Industries SAS, Rueil-Malmaison (FR)

(72) Inventors: Alain Tardivon, Gourville (FR); Mireille Roger, Ruelle-sur-Touvre (FR); Herve Dallet, Soyaux (FR); Francis Chauvet, Mouthiers (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 93 days.

(21) Appl. No.: 15/040,493

(22) Filed: Feb. 10, 2016

(65) Prior Publication Data

US 2016/0277950 A1 Sep. 22, 2016

(30) Foreign Application Priority Data

Mar. 16, 2015 (FR) ...................................... 15 52093

(51) Int. Cl.
*H04W 24/06* (2009.01)
*H04W 72/04* (2009.01)
(Continued)

(52) U.S. Cl.
CPC ............ *H04W 24/06* (2013.01); *H04L 1/1887* (2013.01); *H04L 1/244* (2013.01); *H04L 43/10* (2013.01); *H04W 72/0406* (2013.01)

(58) Field of Classification Search
CPC combination set(s) only.
See application file for complete search history.

(56) References Cited

U.S. PATENT DOCUMENTS

| 2008/0130542 A1 | 6/2008 | Tang |
| 2012/0106369 A1 | 5/2012 | Nagasaka |

(Continued)

FOREIGN PATENT DOCUMENTS

EP 2 887 585 A1 6/2015

OTHER PUBLICATIONS

French Preliminary Search Report dated Jan. 27, 2016 in French Application 15 52093, filed on Mar. 16, 2015 ( with English Translation of Categories of Cited Documents and Written opinion).

*Primary Examiner* — Yee Lam
(74) *Attorney, Agent, or Firm* — Oblon, McClelland, Maier & Neustadt, L.L.P.

(57) ABSTRACT

A method for monitoring a communication between a transmitting equipment item and a receiving equipment item, said transmitting equipment item transmitting control frames (TC_i) to the receiving equipment item. The method makes it possible to take account of the fact that the control frames (TC_i) are not necessarily transmitted at fixed frequency and to adapt the transmission of the diagnostic frames (TDx_i) to the frequency of transmission of the control frames. Upon a significant variation of this transmission frequency, if no diagnostic frame has been transmitted between the two control frames, the instant of transmission of the next diagnostic frame will take account of this aspect. The method of the invention makes it possible to optimize the frequency of transmission of the diagnostic frames while guaranteeing a high reliability concerning the state of the communication, in order to avoid saturating the communication link and causing an overconsumption of electrical energy, and to adapt in real time the transmission of the diagnostic frames to the frequency of transmission of the control frames.

6 Claims, 6 Drawing Sheets

(51) Int. Cl.
*H04L 12/26* (2006.01)
*H04L 1/18* (2006.01)
*H04L 1/24* (2006.01)

(56) References Cited

U.S. PATENT DOCUMENTS

| | | | |
|---|---|---|---|
| 2015/0180756 A1* | 6/2015 | Roger | H04L 43/103 |
| | | | 370/242 |
| 2016/0156409 A1* | 6/2016 | Chang | H04B 7/2041 |
| | | | 370/315 |
| 2016/0277270 A1* | 9/2016 | Roger | H04L 43/0823 |
| 2016/0277950 A1* | 9/2016 | Tardivon | H04L 43/10 |

* cited by examiner

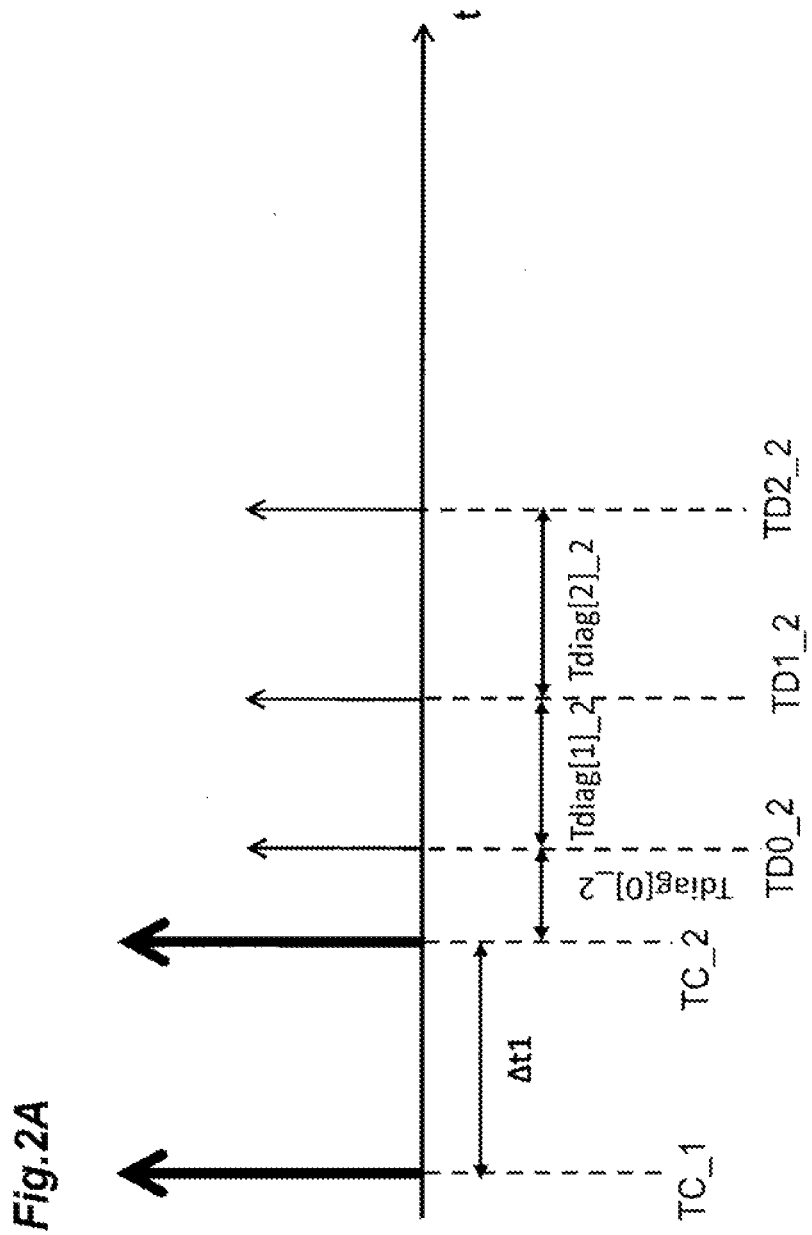

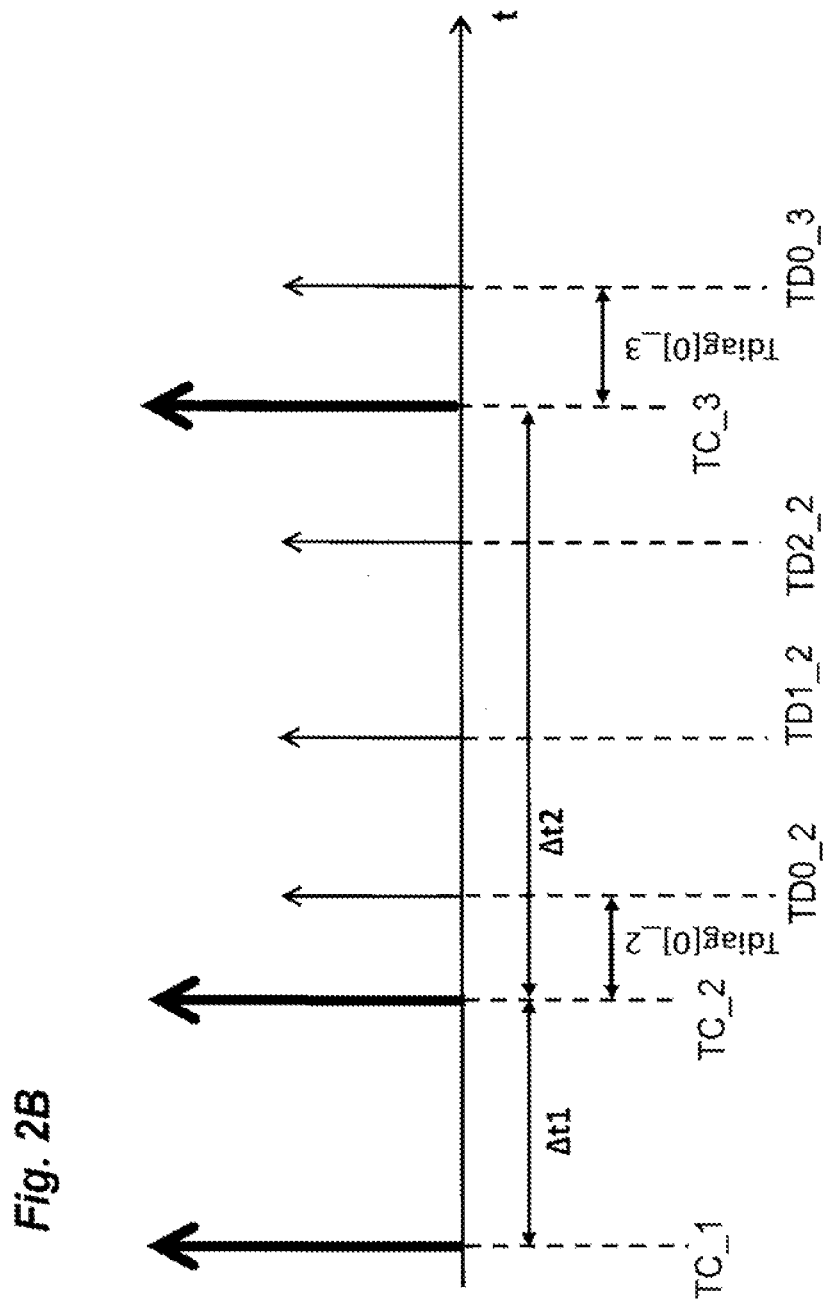

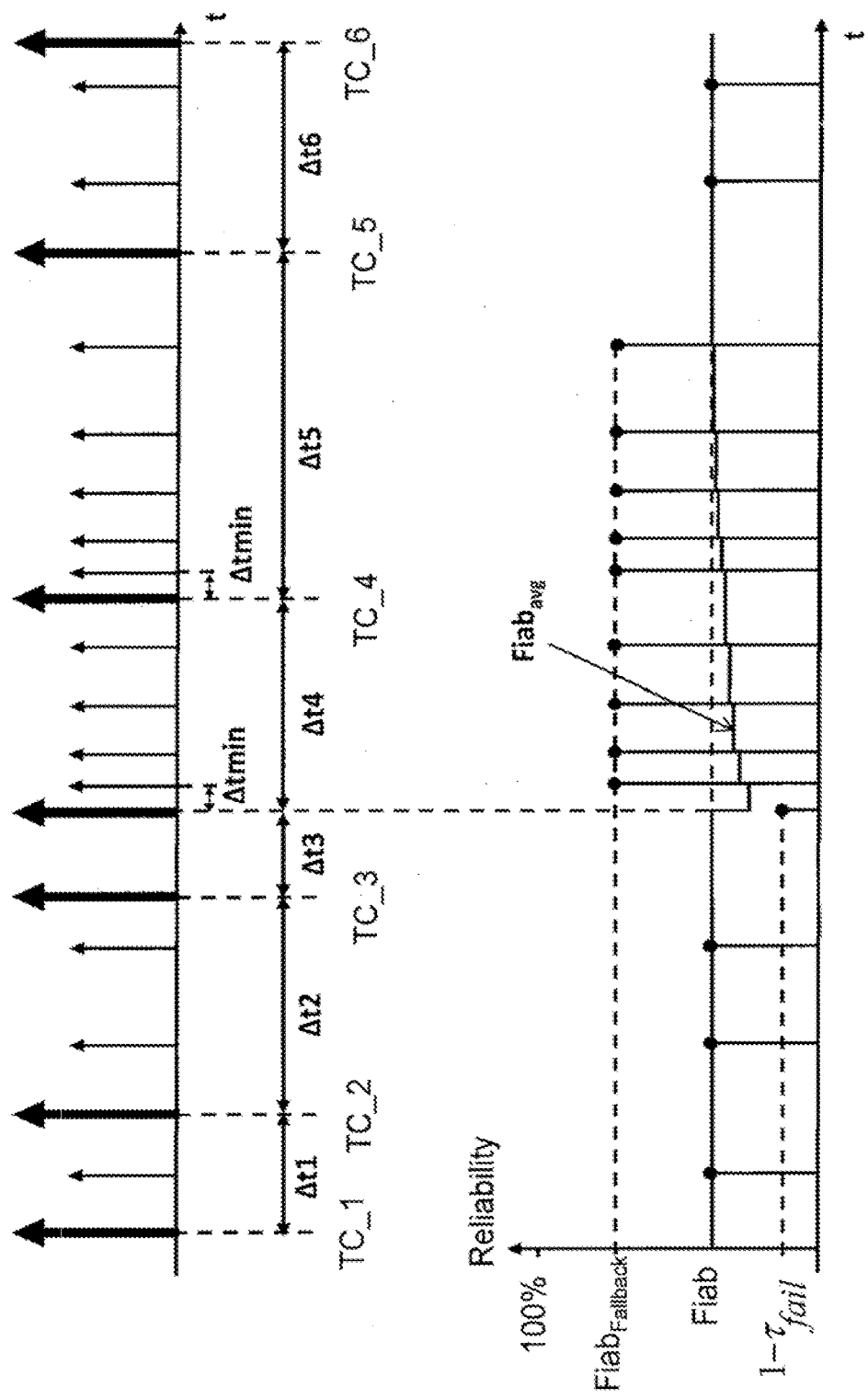

METHOD FOR MONITORING COMMUNICATION BETWEEN A TRANSMITTER AND A RECEIVER

TECHNICAL FIELD OF THE INVENTION

The present invention relates to a method for monitoring a communication between a transmitting equipment item and a receiving equipment item.

STATE OF THE ART

In the industrial world, communication between equipment items has to be reliable because it is instrumental in the control of the machines. Either the communication intrinsically manifests a high level of reliability, which can prove difficult to obtain, or it has to be monitored in order to detect the communication errors between the equipment items. In this second case, it has to be possible to transmit, in addition to the control frames exchanged between the equipment items, diagnostic frames to inform, with a defined level of reliability, as to the state of the communication. The transmission of diagnostic frames makes it possible to detect the communication errors and thus flag these errors. To make it possible to detect a communication error with maximum reliability, the easiest solution consists in transmission of the diagnostic frames at a fixed frequency matched to the highest frequency of transmission of the control frames. However, the transmission of frames at this fixed frequency results in high occupancy, even saturation of the communication link and an overconsumption of electrical energy for the equipment items involved.

Moreover, within one and the same application, the frequency of transmission of the control frames is not necessarily fixed. In the setting phase, the frequency of transmission may be high whereas it may be low in a normal operating phase. Most of the protocols for monitoring communication between two equipment items do not take account of these different aspects.

Moreover, patent application US2012/106369 describes a communication monitoring method.

The aim of the invention is to propose a method for monitoring a communication between a transmitting equipment item and a receiving equipment item, which makes it possible to adapt in real time the transmission of the diagnostic frames to the frequency of transmission of the control frames and to optimize the frequency of transmission of the diagnostic frames in order to avoid saturating the communication link and causing an overconsumption of electrical energy, while guaranteeing a high reliability concerning the state of the communication.

SUMMARY OF THE INVENTION

This aim is achieved by a method for monitoring a communication between a transmitting equipment item and a receiving equipment item, said transmitting equipment item transmitting control frames to the receiving equipment item, said method comprising the following steps:
- transmission by the transmitting equipment item of n control frames $TC\_i$ to the receiving equipment item, i being an integer number ranging from 1 to n and defining the rank of each control frame, n being an integer number greater than or equal to 1,
- determination of an instant of transmission of a diagnostic frame of rank 0 after the transmission of a control frame $TC\_i$, said instant of transmission of said diagnostic frame being determined as follows:

$$TD0\_i = TC\_i + T\text{diag}[0]\_i$$

in which $TD0\_i$ corresponds to the instant of transmission of the diagnostic frame of rank 0 following the control frame $TC\_i$ and with:

$$T\text{diag}[0]\_i = \Delta t - \Delta t\text{diag}$$

in which:
$\Delta t$ corresponds:
- to the time separating the control frame $TC\_i-1$ and the control frame $TC\_i$ if $i \geq 2$ and if at least one diagnostic frame had already been transmitted during said time separating the two control frames, or
- to a predetermined minimum time between the transmission of two control frames if $i \leq 1$ or if no diagnostic frame has been transmitted during said time separating the control frame $TC\_i-1$ and the control frame $TC\_i$, $\Delta t\text{diag}$ corresponds to a time to be determined based on time $\Delta t$, on a predefined reliability value related to the state of the communication, and on a rate of probability of occurrence of a communication failure between two control frames,
- transmission by the transmitting equipment item of said diagnostic frame at the determined transmission instant, to the receiving equipment item,
- determination from an increasing function of the instants of transmission of the following diagnostic frames $TDx\_i$ of rank x, said increasing function being preferably chosen to obtain said predefined reliability value between two control frames by transmission instants separated from one another by a variable time;
- transmission of said diagnostic frames of rank x by the transmitting equipment item to the receiving equipment item.

The solution of the invention thus makes it possible to take account of the fact that the control frames are not necessarily transmitted at fixed frequency and to adapt the transmission of the diagnostic frames to the frequency of transmission of the control frames. Upon a significant variation of this transmission frequency, if no diagnostic frame has been transmitted between the two control frames, the instant of transmission of the next diagnostic frame will take account of this aspect.

According to a particular feature, the method comprises a fallback mode in which the predetermined minimum time between the transmission of two control frames is applied at least for the determination of the instant of transmission of the diagnostic frame of rank 0.

According to another particular feature, the fallback mode is maintained for the subsequent diagnostic frames of rank 0 as long as an average minimum reliability value remains less than said predefined reliability value.

According to another particular feature, the term $\Delta t\text{diag}$ is determined from the following relationship:

$$\Delta t diag = \Delta t \frac{\text{Ln}(Fiab)}{\text{Ln}(1 - \tau_{fail})}$$

With:
Fiab which corresponds to the predefined reliability value, $\tau_{fail}$ which corresponds to a rate of probability of occurrence of a communication failure between two control frames.

Ln represents the Neperian logarithm.

Moreover, in an industrial environment, movements of machines, electromagnetic disturbances, metal mass displacements, movements of people within the data exchange zone, the presence of other transmitting equipment items, are likely to create random disturbances in the exchange of data between the transmitting equipment item and the receiving equipment item. These phenomena are notably likely to disturb the communication between the transmitting equipment item and the receiving equipment item.

According to another particular feature, the method comprises a step of revision of the rate of probability of occurrence of a communication failure when a control frame has not been received or acknowledged by the receiving equipment item.

According to another particular feature, the method comprises a step of limitation to a maximum value of the time between two successive diagnostic frames, when the time between a first instant of transmission of a diagnostic frame of rank x and a second instant of transmission of a diagnostic frame of rank x exceeds said maximum value.

BRIEF DESCRIPTION OF THE FIGURES

Other features and advantages will emerge from the following detailed description, given in light of the attached drawings in which:

FIGS. 1 to 5 represent time diagrams illustrating the various principles of operation of the invention.

DETAILED DESCRIPTION OF AT LEAST ONE EMBODIMENT

Figure 1:
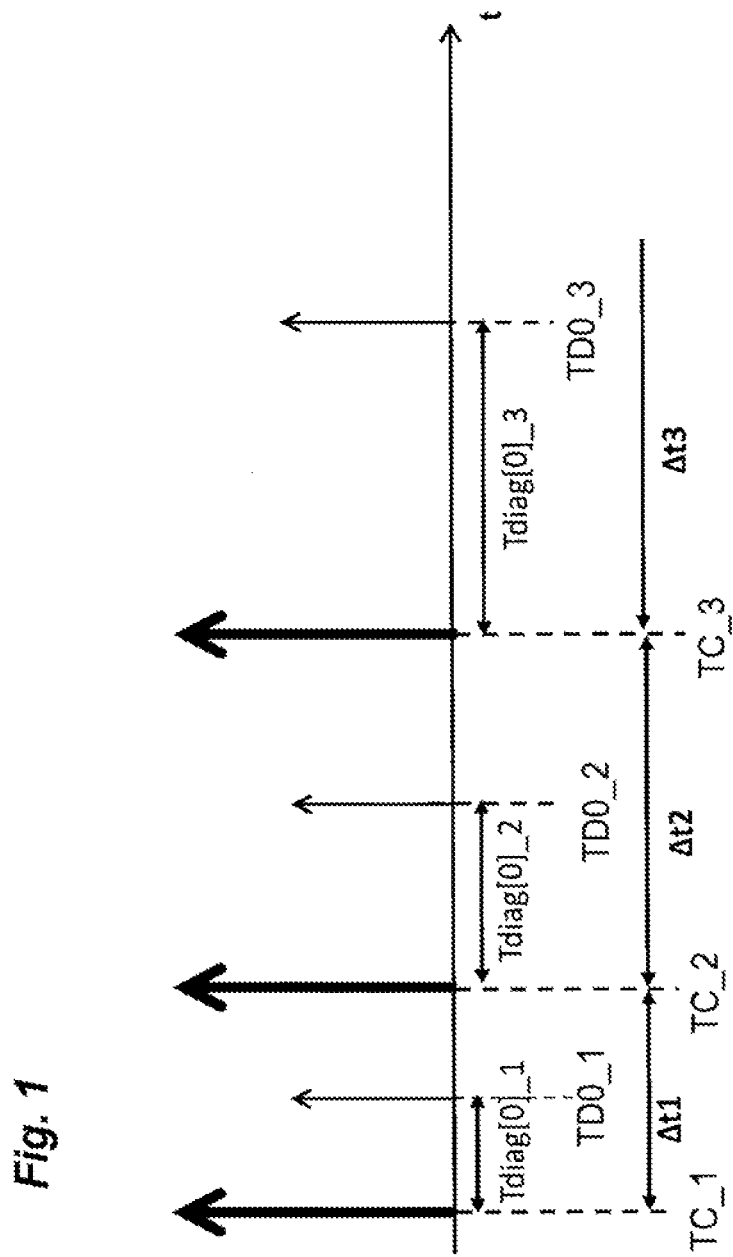

Hereinafter in the description:
the notation "TC_i" denotes both a control frame and the instant of transmission of this control frame,
the notation "TDx_i" denotes both a diagnostic frame and the instant of transmission of this diagnostic frame.

The method of the invention applies to an installation comprising at least one transmitting equipment item and one receiving equipment item connected together through a communication network of wired or wireless type. Obviously, each of these equipment items will be able to exercise both transmitting and receiving functions.

In this installation, the transmitting equipment item sends control frames to the receiving equipment item, for example for the control of a machine. The time $\Delta t$ between the transmission of the control frame TC_i and the next control frame TC_i+1 (i being an integer number ranging from 1 to n and defining the rank of the control frame, n being an integer number greater than or equal to 1) is not necessarily fixed.

The method of the invention consists in monitoring the communication between the transmitting equipment item and the receiving equipment item. It consists of the transmission of diagnostic frames TDx_i (x being an integer number greater than 0 and defining the rank of the diagnostic frame after the control frame TC_i) dedicated to monitoring the communication. The objective of this monitoring is to know the state of the communication before the next control frame TC_i to ensure that the latter has the best possible chance of being transmitted and received without failure. For this, at least one diagnostic frame TDx_i must be transmitted before the probable next transmission of a control frame TC_i. Generally, the instant of transmission of the first diagnostic frame TD0_i coming after a control frame TC_i is expressed by the following relationship:

$$TD0\_i = TC\_i + Tdiag[0]\_$$

In which TD0_i corresponds to the instant of transmission of the diagnostic frame TD0_i and with:

$$Tdiag[0]\_i = \Delta t - \Delta tdiag \quad (1)$$

In which:
$\Delta t$ is a time whose value differs according to the case of operation implemented and described below,
$\Delta tdiag$ is a time to be observed to guarantee the predefined reliability concerning the state of the communication and is expressed as follows:

$$\Delta tdiag = \Delta t \frac{\text{Ln}(Fiab)}{\text{Ln}(1 - \tau_{fail})} \quad (2)$$

In which:
Fiab corresponds to a predefined reliability value for the communication, for example 99%,
$\tau_{fail}$ corresponds to the rate of probability of occurrence of a communication failure between two transmissions of control frames TC_i.

However, in the industrial world, the various phases of a process involve a non-stable communication scheme. The frequency of transmission of the control frames is not therefore necessarily fixed. The invention aims to take account of this aspect in the management of the diagnostic frames.

In order to take account of the variation of the instants of transmission of the control frames, the method of the invention makes it possible to redefine in real time the instant of transmission of the initial diagnostic frame TD0_i of a series of diagnostic frames following the transmission of a control frame.

With reference to the attached figures, an application is defined in which:
The transmitting equipment item transmits n control frames TC_i (for i ranging from 1 to n) to the receiving equipment item,
A time $\Delta ti$ elapses between the control frame TC_i and the control frame TC_i+1, a time $\Delta t\_i+1$ elapses between the control frame TC_i+1 and the control frame TC_i+2.

1. First Example of Operation (FIG. 1)

If at least one diagnostic frame has been transmitted during the time $\Delta ti$, the instant of transmission of the next diagnostic frame TD0_i after the control frame TC_i+1 is determined from the formula (1) defined above in which $\Delta t$ takes the value of $\Delta ti$.

In FIG. 1, it can thus be seen that the diagnostic frame TD0_1 has been transmitted during the time $\Delta t1$. During the time following the control frame TC_2, the diagnostic frame TD0_2 is transmitted after the time Tdiag[0]_2 calculated using the time $\Delta t1$.

2. Second Example of Operation (FIGS. 2A and 2B)

If no diagnostic frame has been transmitted during the time $\Delta ti$, the instant of transmission of the next diagnostic frame TD0_i+1 after the next control frame TC_i+1 is determined from the formula defined above in which $\Delta t$ takes a predefined minimum value $\Delta tmin$, making it possible to ensure the transmission of a diagnostic frame before the next control frame TC_i+2. In this situation, it will be said that the monitoring method switches to a fallback mode.

In FIGS. 2A and 2B, it can be seen that no diagnostic frame has been transmitted during the time Δt1. Consequently, during the subsequent time Δt2, the instant of transmission of the diagnostic frame TD0_2 which should follow the control frame TC_2 is determined from the time Δtmin.

Advantageously, the fallback mode can be retained for the transmission of a number of successive control frames. Such is the case in FIG. 2B, the instants of transmission of the diagnostic frames TD0_2 and TD0_3 being calculated from the time Δtmin.

Like the normal mode of operation, the fallback mode should proceed without saturating the communication link and without resulting in an overconsumption of electrical energy.

Preferentially, in this fallback mode, the reliability rate can be modified to take a fallback value. There is an optimum reliability value (Fiab $_{fallback}$) such that the total number of frames over all of the fallback sequences is minimal. In effect, a high Fiab$_{fallback}$ value makes it possible to have only a limited number of fallback sequences but generates a significant number of diagnostic frames. On the other hand, a low Fiab$_{fallback}$ value makes it possible to reduce the number of diagnostic frames per fallback sequence, but generates a significant number of fallback sequences.

FIG. 3 illustrates the principle of operation of the fallback mode. The second diagram of this figure shows the reliability values taken on a one-off basis and a curve of variation of average minimum reliability value. By detailing this figure, the following sequences emerge:

Over the times Δt1 and Δt2, at least one diagnostic frame has been transmitted between two control frames. The minimum reliability has an average value Fiab$_{avg}$ equal to that (Fiab) which has been predefined for the reliability.

Over the time Δt3, no diagnostic frame has been transmitted between the two control frames. On a one-off basis, the reliability of the communication falls to a value equal to 1−τ$_{fail}$ and the minimum reliability then has an average value Fiab$_{avg}$ which decreases and becomes less than said predefined value (Fiab).

Over the times Δt4 and Δt5, the transmitting equipment item switches to fallback mode by transmitting diagnostic frames whose transmission instants are determined from a second predefined reliability value, denoted Fiab$_{fallback}$, which is greater than the first predefined reliability value Fiab. Thus, the average minimum reliability value rises. The fallback process continues until the average minimum reliability value is restored to the level of the predefined value Fiab.

Over the time Δt6, the transmissions of the diagnostic frames are repeated according to the normal process by taking account of the predefined value Fiab.

According to the invention, as long as no new control frame TC_i has been sent by the transmitting equipment item, the latter sends, after the initial diagnostic frame, other diagnostic frames to the receiving equipment item. Preferentially, the diagnostic frames are transmitted at a variable frequency, making it possible to avoid a saturation of the communication and an overconsumption of energy on the part of the equipment items.

The instants of transmission of the diagnostic frames, which follow the first transmitted diagnostic frame TD0_i, are determined from an increasing function such as, for example, a geometrical series chosen to obtain transmission instants separated by a variable time. The increasing function making it possible to determine the instants of transmission of the diagnostic frames TDx_i (with x greater than or equal to 1) is, for example, the following geometrical series:

$$TDx\_i = TDx\_i-1 + T\,diag[x]\_i$$

$$T\,diag[x]\_i = r(x) \times T\,diag[x-1]\_i \qquad (3)$$

In which r(x) corresponds to the reason for the series.

This increasing function makes it possible to change the time between two diagnostic frames, before the transmission of the next control frame, while ensuring a maximum reliability (close to 100%). With the time between the last control frame and the next control frame increasing, the occurrence of a communication failure reduces since this reliability rate is considered constant between two control frames. Also, even if the diagnostic frames are increasingly far apart from one another, the reliability concerning the state of the communication remains high, close to 100%. As long as no control frame has been transmitted by the transmitting equipment item, diagnostic frames are transmitted at the transmission instants determined using the relationship (3) above.

After each control frame transmission, the diagnostic method is reinitialized and the instant of transmission of the next diagnostic frame is determined using the relationship (1) above and the subsequent instants are determined using the relationship (3).

Figure 4:
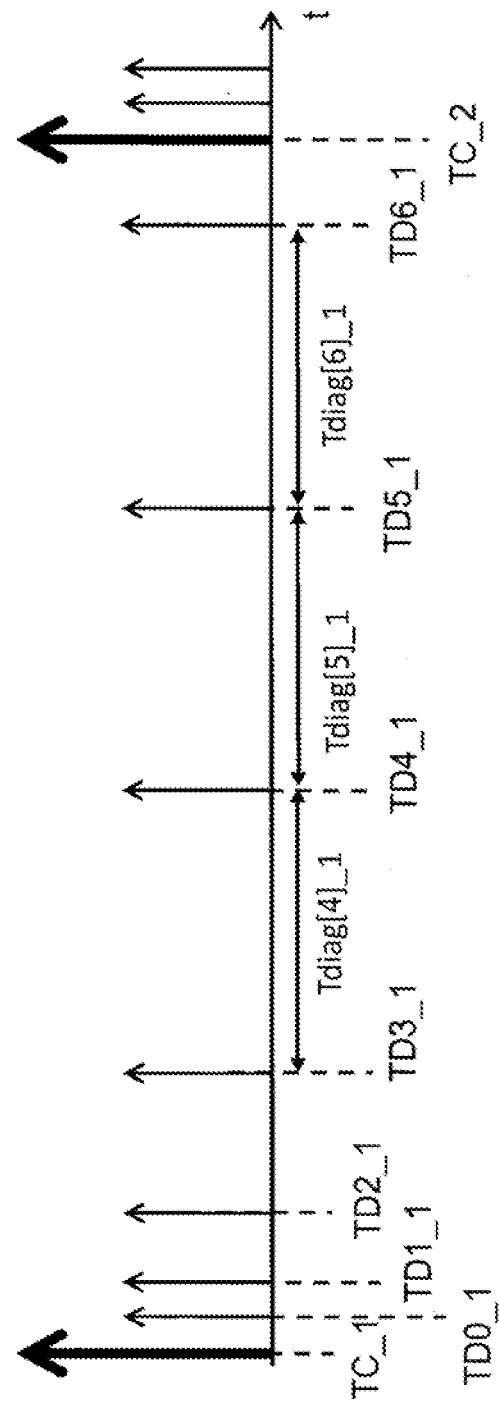

Advantageously, if the time between two diagnostic frames becomes too long, the latter can be limited to a determined upper value. This value will for example be the average period of transmission of the control frames. FIG. 4 illustrates such a solution in which the diagnostic frames TD4_1, TD5_1 and TD6_1 are transmitted at a fixed period, the latter corresponding to a maximum value, which can be stored for example by the transmitting equipment item.

Moreover, when the transmitting equipment item and the receiving equipment item communicate in an unstable communication environment, for example in an industrial environment, communication failures are commonplace. To take account of the possible communication failures, the method of the invention makes it possible, advantageously, to revise the rate of probability of occurrence of a communication failure. Combined with the method for determining diagnostic frames described above, the revision of the rate of probability of occurrence of a communication failure will make it possible to further optimize the number of diagnostic frames transmitted.

The failure rate τ$_{fail}$ reflects the rate of control frames incorrectly received.

It is for example known practice to have the reception of a control frame by the receiving equipment item acknowledged to ensure a good transmission of the control frames. The transmitting equipment item is then notified of the reception or of the non-reception of each control frame TC_i and can launch the appropriate action. It is also well known for the transmitting equipment item to make a number of attempts to transmit a control frame before concluding on non-acknowledgement of the control frame, so doing in order to mask the untimely breaks in communication of very short duration. The calculation of the failure rate τ$_{fail}$ can then for example be based on this acknowledgement process by measuring the number of frames acknowledged relative to the number of frames transmitted.

Figure 5:
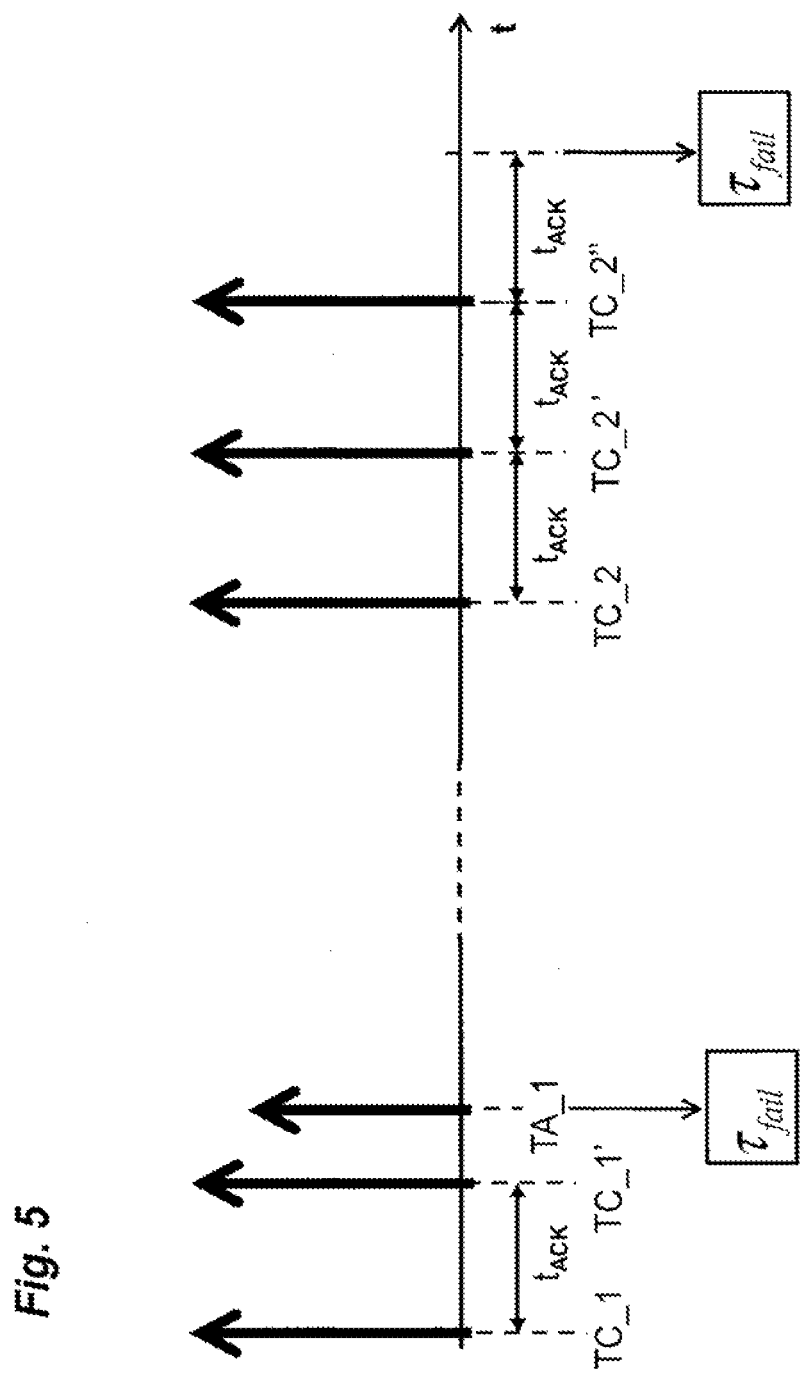

FIG. 5 illustrates the principle of the updating of the rate of probability of occurrence of a communication failure:

The transmitting equipment item transmits a first control frame TC_1 to the receiving equipment item.

After a determined time $t_{ACK}$, the transmitting equipment item has received no acknowledgement frame for this first control frame and once again transmits a control frame TC_1'.

The transmitting equipment item receives an acknowledgement frame TA_1 for this last control frame TC_1'.

The transmitting equipment item reduces the rate of probability of occurrence of a failure $\tau_{fail}$.

The transmitting equipment item proceeds with a number of attempts to transmit a new control frame TC_2, TC_2', TC_2" without receiving any acknowledgement frame.

After the time $t_{ACK}$, the transmitting equipment item increases the rate of probability of occurrence of a failure $\tau_{fail}$.

After each transmission of a control frame, the failure rate $\tau_{fail}$ can thus be re-updated.

Moreover, as described above, the rate of probability of occurrence of a communication failure is defined in relation to Δtdiag in the following expression:

$$\Delta t diag = \Delta t \frac{\text{Ln}(Fiab)}{\text{Ln}(1 - \tau_{fail})} \quad (2)$$

In which:
Δt follows the determined value according to the case of operation described above,
Fiab corresponds to a predefined reliability value for the communication, for example 99%,
$\tau_{fail}$ corresponds to a rate of probability of occurrence of a communication failure between two transmissions of control frames TC_i.

The revision of the rate of probability of occurrence of a communication failure will therefore also have an impact on the optimization of the number of diagnostic frames transmitted.

The invention thus offers a number of advantages, notably:
Adapting the frequency of transmission of the diagnostic frames to the frequency of transmission of the control frames,
Optimizing the number of diagnostic frames transmitted, whether by adapting the calculation of the diagnostic frames and/or by revising the rate of probability of occurrence of a communication failure, while guaranteeing a high reliability concerning the state of the communication,
Guaranteeing a reliability concerning the state of the communication close to 100%, while avoiding saturating the communication link and causing an overconsumption of electrical energy,
Being simple to implement and being able to be adapted to communication networks of wired or wireless type.

The invention claimed is:

1. A method for monitoring a communication between a transmitting equipment item and a receiving equipment item, said transmitting equipment item transmitting control frames to the receiving equipment item, said method comprising:
transmission by the transmitting equipment item of n control frames TC_i to the receiving equipment item, i being an integer number ranging from 1 to n and defining the rank of each control frame, n being an integer number greater than or equal to 1,
determination of an instant of transmission of a diagnostic frame of rank 0 after the transmission of a control frame TC_i of the n control frames TC_i, said instant of transmission of said diagnostic frame being determined as follows:

$$TD0\_i = TC\_i + T\text{diag}[0]\_i$$

in which TD0_i corresponds to the instant of transmission of the diagnostic frame of rank 0 following the control frame TC_i and with:

$$T\text{diag}[0]\_i = \Delta t - \Delta t\text{diag}$$

in which:
Δt corresponds:
to the time separating the control frame TC_i−1 and the control frame TC_i if i≥2 and if at least one diagnostic frame had already been transmitted during said time separating the two control frames, or
to a predetermined minimum time between the transmission of two control frames if i≤1 or if no diagnostic frame has been transmitted during said time separating the control frame TC_i−1 and the control frame TC_i,
Δtdiag corresponds to a time to be determined based on time Δt, on a predefined reliability value related to a state of the communication, and on a rate of probability of occurrence of a communication failure between two control frames,
transmission by the transmitting equipment item of said diagnostic frame at the determined transmission instant, to the receiving equipment item,
determination from an increasing function of the instants of transmission of subsequent diagnostic frames TDx_i of rank x, and
transmission of said subsequent diagnostic frames of rank x by the transmitting equipment item to the receiving equipment item.

2. The method according to claim 1, characterized in that it comprises a fallback mode in which the predetermined minimum time between the transmission of two control frames is applied at least for the determination of the instant of transmission of the diagnostic frame of rank 0.

3. The method according to claim 2, characterized in that the fallback mode is maintained for the subsequent diagnostic frames of rank 0 as long as an average minimum reliability value remains less than said predefined reliability value.

4. The method according to claim 1, characterized in that the term Δtdiag is determined from the following relationship:

$$\Delta t diag = \Delta t \frac{\text{Ln}(Fiab)}{\text{Ln}(1 - \tau_{fail})}$$

with:
Fiab which corresponds to the predefined reliability value,
$\tau_{fail}$ which corresponds to a rate of probability of occurrence of a communication failure between two control frames.

5. The method according to claim 4, characterized in that it comprises a step of revision of the rate of probability of occurrence of a communication failure when a control frame has not been received or acknowledged by the receiving equipment item.

6. The method according to claim 1, characterized in that it comprises a step of limitation to a maximum value of a time between two successive diagnostic frames, when the time between a first instant of transmission of a diagnostic frame of rank x and a second instant of transmission of a diagnostic frame of rank x exceeds said maximum value.

\* \* \* \* \*